(No Model.)

G. G. HASBROUCK.
PITMAN ROD.

No. 545,648.   Patented Sept. 3, 1895.

Attest:
A. N. Jesbera
E. M. Shuster

Inventor:
George G. Hasbrouck
by William B. Greeley
Att'y.

UNITED STATES PATENT OFFICE.

GEORGE G. HASBROUCK, OF NYACK, NEW YORK.

PITMAN-ROD.

SPECIFICATION forming part of Letters Patent No. 545,648, dated September 3, 1895.

Application filed February 6, 1895. Serial No. 537,448. (No model.)

*To all whom it may concern:*

Be it known that I, GEORGE G. HASBROUCK, of the town of Nyack, in the county of Rockland and State of New York, have invented certain new and useful Improvements in Pitman-Rods; and I do hereby declare that the following is a full and exact description thereof, reference being had to the accompanying drawings, and to the letters of reference marked thereon, making a part of this specification.

In certain classes of machines—such as sewing-machines, jig-saws, or other like machines—in which a pitman-rod is used to transmit motion from one working part—such as a treadle—to another working part—such as a driving-wheel—it is desirable that provision should be made for taking up wear on the bearings of the pitman-rod and also for varying the length of the pitman-rod. At the same time it is desirable to keep the cost as low as possible.

It is the object of this invention to provide a pitman-rod which shall answer these requirements.

The improved construction which has been devised for this purpose is shown in the accompanying drawings and is described in detail hereinafter.

Figure 1:
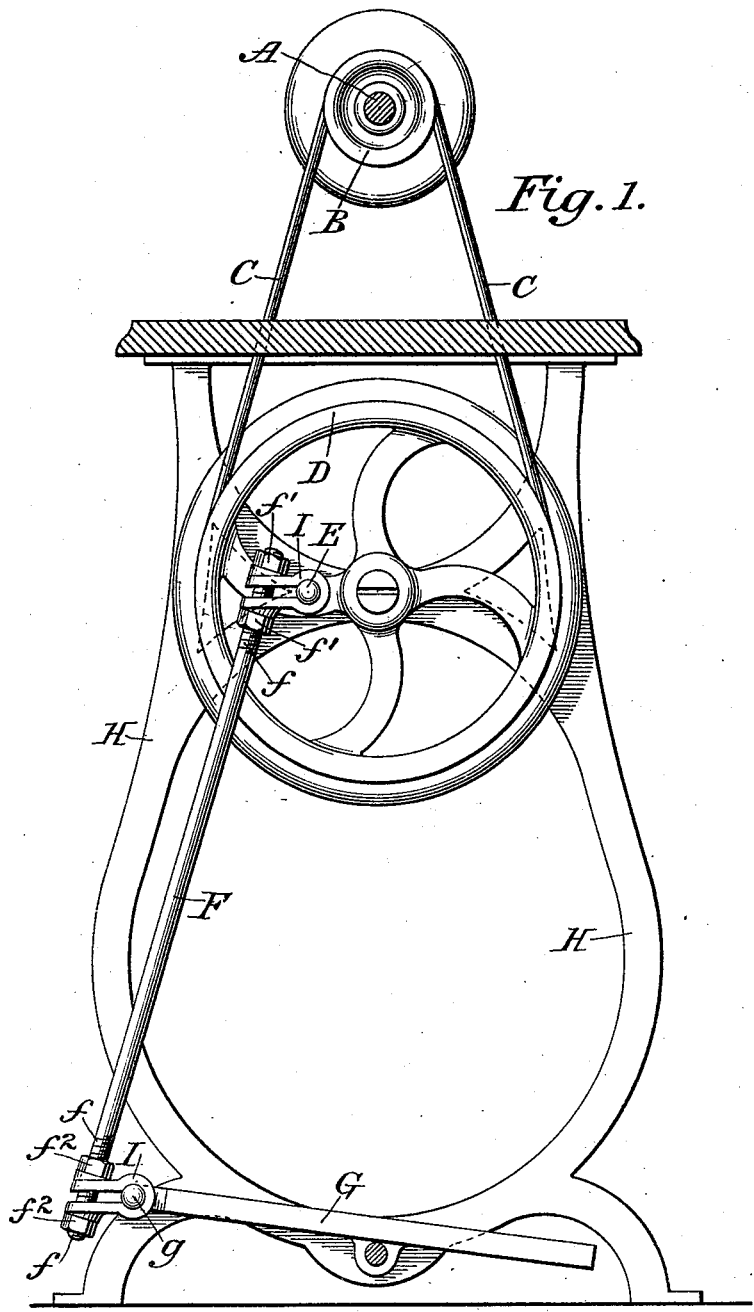
Figure 2:

In the drawings, Figure 1 is a partly-sectional elevation of a machine provided with the improved pitman-rod, and Fig. 2 is a detail perspective view showing one of the bearing yokes or clips.

The machine chosen for illustration of the application of the improved pitman-rod is represented as having a driven shaft A and pulley B, a driving-band C, and a driving-wheel D. The latter has a crank or eccentric pin E, which is connected by the pitman-rod F to the stud $g$ of a treadle G, the several parts being supported by a suitable supporting-frame H.

The rod F is screw-threaded, preferably at each end, as at $f\, f$, and is provided at each end with an abutment and a nut, or preferably with two nuts, as $f'\, f'$ and $f^2\, f^2$. A bearing-yoke I is formed to embrace the crank-pin E or stud $g$, substantially as shown in Fig. 2, the free ends of the yoke being perforated, as at $i\, i$, to slip upon the ends of the rod F, and each yoke being held between the nuts $f'\, f'$ or $f^2\, f^2$, as shown in Fig. 1. By adjusting one of the nuts of a pair toward the other the ends of the yoke will be pressed toward each other to take up wear either on the bearing itself or on the pin or stud, while by adjustment of either or both of the two pairs of nuts longitudinally upon the rod the length of the rod may be varied more or less, as required, to shift the position of the treadle or for any other purpose.

It will be observed that all the advantages of easy and quick adjustment, either for taking up wear or for varying the length of the rod, are secured by my improvement without any material increase of cost over the ordinary pitman-rod used in machines of the general character of those referred to.

I claim as my invention—

1. A pitman rod comprising a rod having its ends threaded, an abutment secured on said rod, a bearing yoke formed to embrace the bearing pin or stud and having its ends perforated to receive the end of the rod, and a nut on said rod to press together the ends of the yoke, substantially as shown and described.

2. A pitman rod comprising a rod having its end threaded, two nuts on said rod and a bearing yoke formed to embrace the bearing pin or stud and having its ends perforated to receive the end of the rod and placed on said rod between the nuts, substantially as shown and described.

In testimony whereof I have signed my name to this specification in the presence of two subscribing witnesses.

GEORGE G. HASBROUCK.

Witnesses:
W. B. GREELEY,
A. N. JESBERA.